United States Patent Office 3,070,437
Patented Dec. 25, 1962

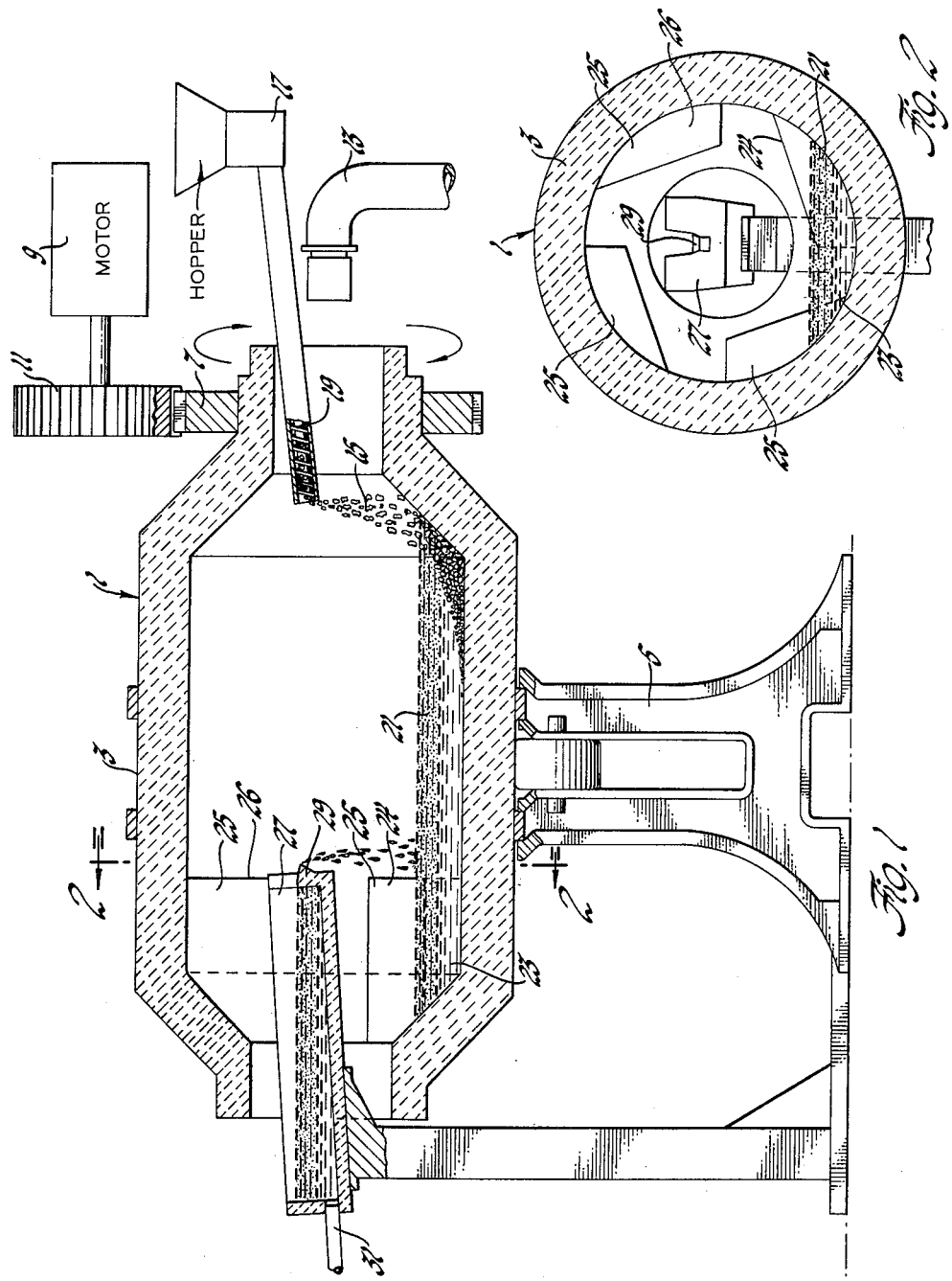

3,070,437
METHOD AND APPARATUS FOR MELTING ALUMINUM IN A SALT BATH ROTARY FURNACE
Robert W. Bacheldor, Plymouth, Mich., assignor to General Motors Corporation, Detroit, Mich., a corporation of Delaware
Filed Mar. 14, 1961, Ser. No. 95,542
6 Claims. (Cl. 75—65)

This invention relates to a rotary melting furnace and more particularly to a furnace for the melting of aluminum in molten salt on a continuous operating basis.

The use of rotary melting furnaces are well known in the art for the melting of various metals and/or other materials on a batch operating basis. In such use the materials are loaded in one end of the cylindrical or barrel-like furnace body and the necessary heat is applied to melt the materials, the furnace body being rotated about its longitudinal axis during all or a portion of the heating cycle. Upon completion of the melting operation, the application of heat is stopped and the molten material is poured from the furnace by tilting the furnace or by using any other means well known in the art.

It is obvious that such batch operation is time consuming and costly where large melts of material are being processed. It is accordingly one object of my invention to provide a rotary furnace for melting aluminum chips or other forms of the metal on a continuous operating basis, the aluminum chips being fed into the furnace at one end and molten aluminum being withdrawn from the furnace at the other end, the furnace being provided at the outlet end with means for carrying molten aluminum and salt from the bottom to the top where it is spilled into a collector, the molten salt overflowing back to the bottom of the furnace and the aluminum being drawn-off from the bottom. It is another object of my invention to provide the furnace with scoop-like members on the inner wall surface thereof for carrying the molten aluminum and salt to the upper portion thereof and to provide a receiver within the central portion of the body to catch the mixture of molten salt and aluminum, the salt overflowing into the bottom of the furnace, the molten aluminum being drawn-off from the bottom portion of the receiver. It is a further object of my invention to provide a continuous operating method for melting aluminum in a salt bath, the aluminum being continuously fed into the rotary furnace at one end and the molten aluminum and salt being continuously carried to the upper portion of the furnace at the other end and poured into a decanting receiver which catches the molten materials, the molten salt overflowing from the top and the molten aluminum being withdrawn from the bottom.

The foregoing and other objects of my invention are attained by providing on the inner surface of the body of a rotary furnace at the end remote from the loading end means for carrying successive portions of the molten material to the upper side of the body and providing a means for collecting the molten material, the long dimension of the furnace body being co-extensive with its longitudinal axis.

My invention would be better understood by reading the specification as illustrated by the drawing on which FIGURE 1 shows a sectional view of a rotary furnace constructed in accordance with the principles of my invention; and FIGURE 2 shows a cross-sectional view on plane 2—2 of FIGURE 1.

Having reference to FIGURE 1, there is shown a rotary furnace 1 comprising a body 3 formed with a refractory lining and mounted for rotational movement about its longitudinal axis on the supporting base 5. While the construction for supporting and rotating the furnace body is conventional in the art and forms no part of my invention, I have schematically illustrated the rotating mechanism in terms of a driven gear 7 secured to the furnace body driven by a motor 9 and driving gear 11. As shown, the long dimension of the furnace body is co-extensive with the longitudinal axis, the metal solids being fed in at one end and the molten aluminum being removed at the other end. This construction provides a sufficient length through which the metal chips must move as the furnace body rotates to enable the metal to melt. The furnace body is shown in FIGURE 1 as having its longitudinal axis or axis of rotation in a substantially horizontal plane. However, the axis may be tilted downwardly in the direction of movement of the metal to assist in the progression of the material from the loading end to the removal end. The heat necessary for melting the aluminum and for maintaining the salt layer in a molten condition is supplied by any suitable means well known in the art and is shown in FIGURE 1 as a gas heater or nozzle 13 adapted to project the flame through the loading end into the body of the furnace. The axis of the furnace body may alternatively be tilted upwardly to delay forward movement of the aluminum solids and enable sufficient time in the furnace for complete melting of aluminum and retention of solid impurities.

As shown in FIGURE 1, the aluminum solids 15 in the form of chips, borings, or granules, either loose or briquetted, are continuously fed from a supply hopper 17 into the furnace body 3 by any suitable means well known in the art, a screw feed 19 being illustrated. As shown, the aluminum progresses through the molten salt as the furnace body is rotated and is itself melted, gas nozzle 13 supplying the heat as necessary. Since the molten salt 21 has a lesser specific gravity than the molten aluminum 23, the salt floats on the aluminum and serves to protect the aluminum from oxidation.

As is clearly shown in FIGURE 1 and FIGURE 2, the furnace 1 is specially constructed in order to enable continuous operation. I have provided on the inner wall surface of the body 3 a plurality of spaced apart scoop-like members 25 for carrying the molten materials from the bottom to the top of the furnace as the body 3 rotates. The scoops 25 are located at the end of the furnace remote from the loading end in order to assure that only molten materials are picked up. While the shape of the scoop is generally immaterial to my invention and is shown in FIGURES 1 and 2 as being formed by the inner wall surface of the body 3 and by a top portion 24 and side portion 26, the height of the scoop opening should be somewhat greater than the maximum depth of the molten materials in the bottom of the furnace in order to preclude air pockets in the scoop with possible oxidizing effects on the aluminum.

As is clearly shown in FIGURES 1 and 2, I have provided a receiver 27 formed of or lined with any suitable refractory material for collecting the molten materials being spilled from the scoops 25 as they rotate in the upper part of the furnace body 3. The receiver 27 is provided with an overflow spout 29 on its innermost end in order to enable the automatic decanting of molten salt 21 while always retaining a layer of molten salt over the molten aluminum, the salt being returned to the molten layer in the bottom of the furnace body. A draw-off conduit 31 is shown at the bottom portion of the receiver 27 for the continuous removal of molten aluminum.

It is thus apparent that I have provided a simplified construction and effective method for the continuous melting of aluminum solids and drawing-off of molten aluminum. In operation aluminum is continuously fed at a controlled rate into a rotary furnace containing a molten salt layer, the furnace being rotated and heated to progress the solids through the furnace while at the same time melting the solids. Successive portions of the molten materials are carried from the bottom to the top of the furnace at the exit end thereof, the molten materials being spilled into a collecting member and being separately decanted, the molten salt returning to the furnace and the molten aluminum being drawn off to its point of use.

Having disclosed my invention in terms of the preferred embodiment, it should be understood that other forms thereof will be apparent to those skilled in the art and are intended to be within the scope of my invention as defined by the claims which follow.

I claim:

1. In a rotary furnace for melting aluminum in molten salt on a continuous operating basis, the combination comprising a generally cylindrical furnace body having its long dimension co-extensive with its longitudinal axis and having a refractory lining, means for applying heat to the interior of said body, means supporting said body for rotation about its longitudinal axis, means for rotating said body, means at one end of said body for feeding metal thereto, means on the inner wall surface of said body at the end thereof opposite the metal feeding end for carrying successive portions of the molten aluminum and salt to the upper side of said body and a collecting member positioned within said furnace body to receive the molten aluminum and salt as it is spilled from said carrying means, means in said collecting member for separately decanting said molten salt and aluminum, the molten salt being decanted directly to the furnace body, the molten aluminum being drawn off for use.

2. In a rotary furnace for melting aluminum chips in molten salt on a continuous operating basis, the combination comprising a generally cylindrical furnace body having its long dimension co-extensive with its longitudinal axis and having a refractory lining, means for heating said body, a support for said body enabling rotation thereof about its longitudinal axis, means for rotating said body, an aluminum feeder at one end of said body, a plurality of spaced apart scoops on the inner wall surface of said body at the end opposite the metal feeding end for carrying successive portions of the molten aluminum and salt to the upper side of said body and a receiver positioned within said body to catch the molten aluminum and salt as it is spilled from said scoops, said receiver having an overflow spout on its innermost end to enable the molten salt to return to the pool of molten materials in the bottom of said body and having a drain opening in its bottom portion for removing molten aluminum.

3. The device as set forth in claim 2 wherein the longitudinal axis of the body is tilted downwardly in the direction of flow of the aluminum in order to assist the movement of the aluminum through the furnace.

4. The device as set forth in claim 2 wherein the longitudinal axis of the body is tilted upwardly against the direction of flow of the aluminum in order to assure the complete melting of the aluminum and retention of solid impurities in the low end of the body.

5. A process for melting aluminum in a salt bath rotary furnace on a continuous operating basis comprising the steps of continuously feeding aluminum at a controlled rate into a rotary furnace containing a molten salt layer, rotating the furnace and supplying heat to move the solids through the furnace while at the same time melting the solids, carrying the molten materials from the bottom to the top of the furnace at the exit end thereof, spilling the molten materials directly into a collecting member and separately decanting the salt and aluminum layers, the molten salt returning to the furnace and the molten aluminum being drawn off to its point of use.

6. A process as set forth in claim 5 wherein the aluminum is fed into the furnace in the form of briquettes.

References Cited in the file of this patent

UNITED STATES PATENTS

| | | |
|---|---|---|
| 1,841,625 | Musso | Jan. 19, 1932 |
| 2,872,386 | Aspegren | Feb. 3, 1959 |
| 2,962,277 | Morrill | Nov. 29, 1960 |
| 2,987,391 | Foster et al. | June 6, 1961 |